United States Patent [19]
Pynn

[11] 3,879,969
[45] Apr. 29, 1975

[54] FUEL LINE LOCK FOR A MOTOR VEHICLE

[76] Inventor: Leander G. Pynn, Pynn Real Estate, Meredith, N.H. 03253

[22] Filed: Nov. 15, 1973

[21] Appl. No.: 416,149

[52] U.S. Cl. ................. 70/242; 137/354; 137/384.6
[51] Int. Cl. ............................................. B60r 25/04
[58] Field of Search ............. 70/176, 242, 243, 256, 70/257, 360, 361; 137/354, 383, 384.6

[56] References Cited
UNITED STATES PATENTS

| | | | |
|---|---|---|---|
| 1,102,830 | 6/1914 | Walker | 70/243 |
| 1,198,341 | 9/1916 | Geery | 70/195 |
| 1,600,050 | 9/1926 | Kessler | 70/242 |
| 1,696,957 | 1/1926 | Jacobi | 70/243 |
| 3,771,547 | 11/1973 | Coleman | 137/384.2 |

Primary Examiner—Albert G. Craig, Jr.
Attorney, Agent, or Firm—K. L. King; William D. Hall

[57] ABSTRACT

A fuel line lock for locking the fuel line of an automobile or other motor vehicle is disclosed. A push button locking member is mounted within the driver's compartment to close a reciprocating valve mounted in the fuel line between the fuel tank and the engine. The valve includes a resilient biasing means which normally biases the valve to its open position. The locking member includes a key operated tumbler and is reciprocally linked to the fuel line valve by means of an armored and flexible cable. As the lock member is depressed, the fuel line valve is closed and the lock is engaged. The lock is disengaged by rotating a key operated tumbler which unlocks the reciprocating member and allows the valve to be opened by the resilient biasing means.

1 Claim, 5 Drawing Figures

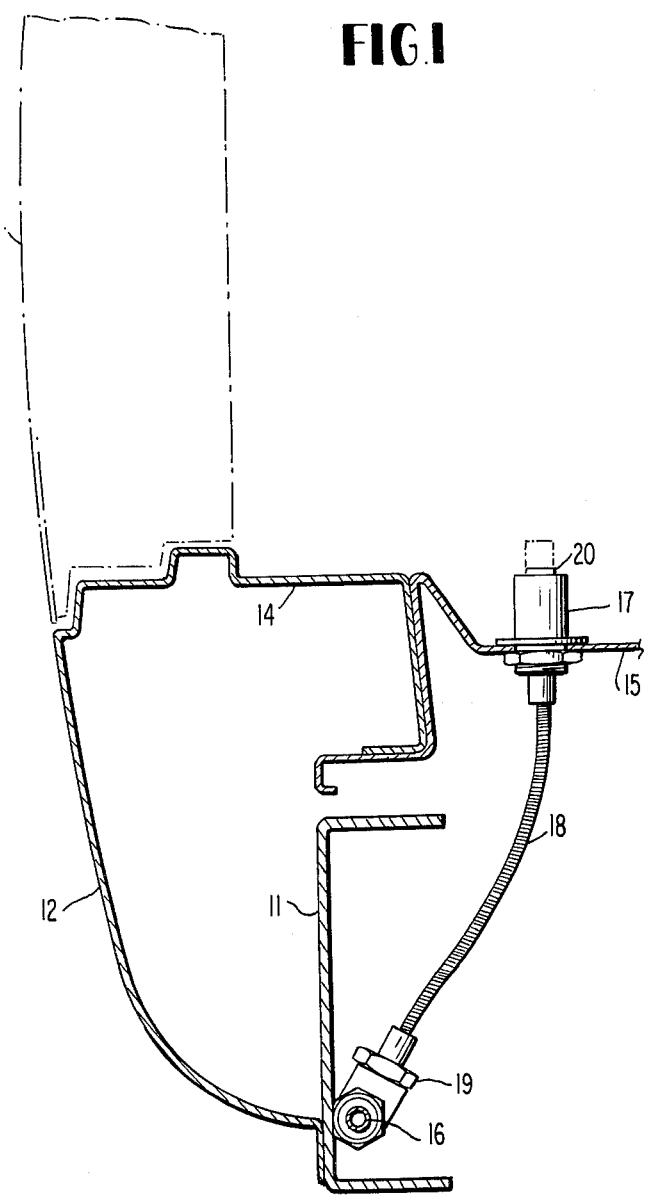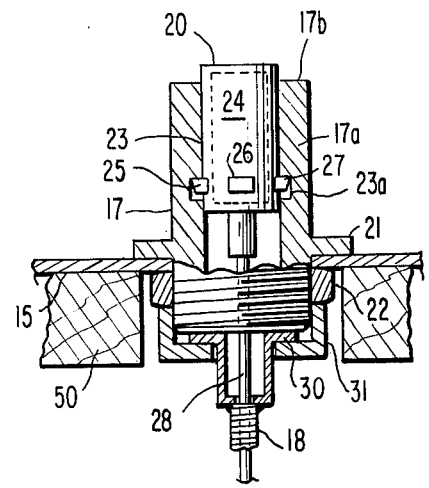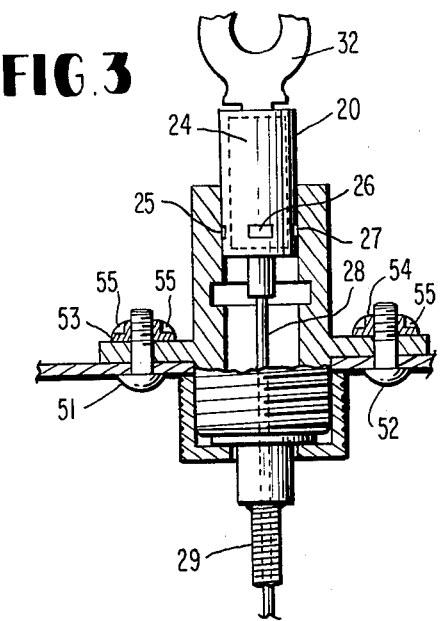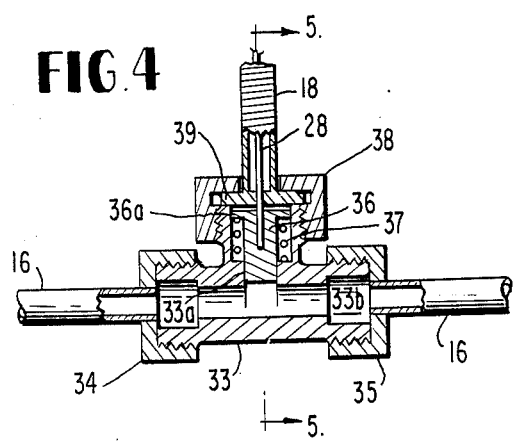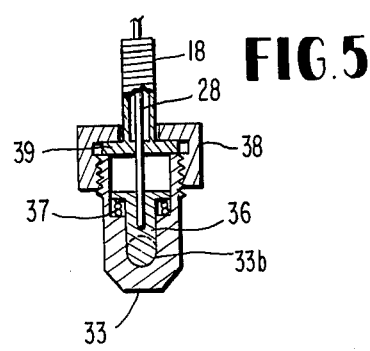

FUEL LINE LOCK FOR A MOTOR VEHICLE

BACKGROUND OF THE INVENTION

The present invention relates to fuel line locks for motor vehicles. These locks are mounted in the fuel lines of motor vehicles to prevent the unauthorized use or appropriation of the motor vehicle by others.

Since it is a relatively easy matter to "hot wire" or wire around the ignition switch of an automobile, fuel line locks have been used to prevent the unauthorized use even when the ignition switch has been jumped. By placing an additional locking means in the gasoline fuel line, the gasoline supply can be closed. It should also be noted that a small amount of gasoline will remain in the carburetor bowl and fuel pump. This small amount of gasoline is sufficient to move the car in the event of an emergency.

The prior art devices which serve to lock the fuel line of an automobile have proved to be relatively complex, expensive to manufacture, and in some cases difficult to operate.

OBJECTS OF THE PRESENT INVENTION

It is therefore an object of the present invention to provide an improved fuel line lock for a motor vehicle which will make use of standard components and obviate the requirements for specialized valves, locks and other devices. By using standard tee-fittings, the fuel line lock may be installed in existing fuel lines without any costly modification of the vehicle. The use of these standard components also lowers the cost of the fuel line locks significantly, and renders it economically feasible to install them on a motor vehicle.

It is another object of the present invention to provide a simplified locking mechanism for a fuel line lock which may be quickly and easily actuated by the driver of the motor vehicle as he leaves the vehicle. When incorporating the locking mechanism in a push button drive, the valve may be closed and the lock engaged merely by depressing a button as one leaves the motor vehicle. In maximizing the convenience of locking of the fuel line, the use of the fuel line lock is increased. The fuel line lock will be ignored by a large percentage of the drivers, if the driver is required to withdraw his key from the ignition, and insert it in an additional locking device before leaving the vehicle. As constructed, the driver needs only to depress a push button actuating mechanism and the fuel line lock is engaged. After the driver returns to the vehicle, it is then necessary to insert the key to unlock the fuel line.

It is another object of the present invention to use standard components such as the standard tee-fitting in the fuel line. By using a standard tee-fitting and constructing a valve means to be incorporated within a standard fitting, the cost of the device is reduced substantially, and the device may be installed on existing vehicles with a minimum amount of inconvenience, and reconstruction of the fuel line system.

BRIEF DESCRIPTION OF THE DRAWINGS

FIG. 1 is a partially cross-sectioned view of a portion of a motor vehicle with the fuel line lock installed.

FIG. 2 is a partially cross-sectioned view of the push button lock means with the locking means engaged.

FIG. 3 is a partially cross-sectioned view of the push button locking means with the lock means disengaged.

FIG. 4 is a cross-sectioned view of the fuel line valve and standard tee-fitting.

FIG. 5 is a cross-sectioned view of the fuel line valve and tee-fitting taken along section line 5:5 of FIG. 4.

DESCRIPTION OF THE PREFERRED EMBODIMENTS

FIG. 1 is a partially cross-sectioned view of a portion of a motor vehicle having the fuel line lock installed. The motor vehicle is represented by the channel frame 11, the rocker panel 12, a door 13, sill means 14, and floor board member 15. The fuel line 16 is normally located within the main channel frame 11 of the motor vehicle. As illustrated in FIG. 1, the installation of the fuel line lock and the standard tee fitting may be accomplished within the existing space found within the U-shaped channel which forms the frame of the vehicle.

The fuel line locking means includes a locking mechanism 17, an armored and flexible cable 18, and a fuel line valve 19. Although the details of the locking mechanism and the fuel line valve will be hereinafter described in more detail, it should be noted that FIG. 1 illustrates the push button portion 20 of the locking means in its depressed position. When the push button 20 is depressed, the lock is engaged and the fuel line valve is closed. When the lock is disengaged, the push button 20 is returned to the position illustrated by the dotted lines of FIG. 1, and the fuel line valve is opened.

Although FIG. 1 illustrates the fuel line lock installed on an automobile, it would be apparent to those skilled in the art that the lock could be installed on any motor vehicle, be it a truck, tractor, or airplane.

FIG. 1 also illustrates the close proximity of the locking mechanism to the fuel line valve. Since virtually all motor vehicles have the gas tank installed in the opposite end of the vehicle from the engine, the fuel line traverses the length of the vehicle under the driver's compartment. The conventional front engine automobile has the fuel tank in the rear, with the fuel line running along the lower frame member of the automobile. Rear engine cars normally have their fuel tank mounted in the front of the vehicle, with the fuel line mounted under the floor board. The short length of flexible cable 18, and the flexibility of the placement of the fuel line locking mechanism makes it possible to adapt the fuel line lock to virtually any automobile on the market. Although the fuel line lock could be disposed on the dash board of the vehicle, the preferred position is on or near the floor board level to minimize the length of the flexible cable 18. The use of an armored cable 18 makes it necessary for a person seeking unauthorized use or appropriation of the vehicle to employ either a hacksaw or bolt cutter to open the valve 19. Similarly, the confines of beam 11 would make the use of a hacksaw difficult if not impossible. In any event, such a person would have to spend a substantial amount of time under the vehicle in order to locate the lock. Any attempt to remove the valve itself from the vehicle would result in a break in the fuel line, and the loss of gasoline from the fuel tank.

The locking mechanism is illustrated in FIGS. 2 and 3. The locking mechanism 17 may be securely clamped to the floor board member 15 by means of an outwardly extending flange 21 and a lock nut 22. The armored cable 18 is also secured to the lock housing by means of a knurled lock nut 31. If this method of securing the lock is used, the nuts may be protected from tampering by a wooden member 50 which is adapted to "house" or completely cover the lock nut surfaces as illustrated in FIG. 2. This would prevent the unauthorized removal of the cable. Alternately, the lock could be secured to the floor board by blind bolts 51 and 52 as illustrated in FIG. 3. The bolts 51 and 52 are secured on their upper side by hemispherical nuts 53 and 54 having special engaging recesses 55 formed therein. It would then be necessary to use a special wrench fitted to the recesses 55 to remove the lock from the floor board. The locking device 17 has a substantial upwardly projecting portion 17a which is designed to insure that the locking device extends through the sound deadening and padding material normally found under the carpet of a modern automobiel. The exact location of the flange 21 and lock nut 22 could be varied along the entire outer perimeter of the locking device 17 to insure that the upper portion 17b and the push button reciprocating member 20 is flush with the carpet of the motor vehicle. Locking mechanism 17 includes the outer housing member which defines a reciprocal passageway 23 for a push button member 20. Push button reciprocating member 20 carries within it a key operated tumbler 24 illustrated by the dotted lines in FIG. 2.

The inner sidewalls of the housing member also define an annular indent 23a which extends around the inner periphery of the reciprocal passageway 23. The push button reciprocating member 20 includes a plurality of radially reciprocating engagement means 25, 26 and 27 which engage the indent 23a formed within the housing member 17. The key operated tumbler 24 withdraws the engagement means 25–27 when the tumbler is turned. The engagement means 25–27 are normally biased outwardly as illustrated in FIG. 2 to securely engage the indent 23a.

Push button reciprocating member 20 also is securely or fixably attached to a flexible actuating means or cable 28 which is connected to the fuel line lock. As the push button member is depressed to the position as illustrated in FIG. 2, the fuel line lock is closed, and the locking lugs 25–27 reciprocate axially outwardly to engage the annular indent 23a. The fuel line valve is held in its closed position as the engagement lugs 25–27 engage the annular groove 23a. The actuating means further includes a flexible and armored cable 18 which forms a housing for the reciprocating cable 28. Housing means 18 is secured to a flange member 30 which is in turn secured to housing 17 by means of a lock nut 31. Nuts 22 and 31 may be locked together to prevent the loosening of the nuts from vibration which normally occurs from the operation of the motor vehicle. Alternatively, the nuts 22 and 31 may be secured by means of pins or blind set screws to prevent the removal of same by someone desiring unauthorized use of the motor vehicle.

To unlock the fuel line, a key 32, illustrated in FIG. 3, is inserted into the push button reciprocating member 20 to rotate the tumbler means 24 and thereby withdraw the locking lugs 25–27 into the body of the reciprocating member 20. Once the lugs are withdrawn, a resilient means in the valve body is allowed to force the reciprocating member 20 upwardly by means of flexible cable 28 and the armored housing member 18. Alternatively, it would be possible to secure or place an additional resilient means within the housing 17 to insure that the reciprocating member 20 is withdrawn or forced outwardly to the position illustrated in FIG. 3 when the locking lugs 25–27 are disengaged.

The fuel line valve is disclosed in FIGS. 4 and 5. FIG. 4 illustrates a standard fuel line tee-fitting 33 which is adapted to engage a fuel line 16 by means of locking nuts 24 and 35. The tee-fitting 33 may be adapted to receive fuel line ferrules or flairs depending upon the preference of the mechanic installing the valve. The valve means includes a valve body 36 which is sized to reciprocate within the standard tee passageway 33a. The reciprocating portion of the valve body 36 is sized to the same dimensions as the interior passageway in order to completely block the through passageway 33b when the valve is closed.

FIG. 5 is a cross-sectioned view taken along section lines 5:5 of FIG. 4. It illustrates the valve means in its closed position with the valve body 36 reciprocated downwardly to completely block the through passageway 33b. The valve means illustrated in FIG. 4 also includes a resilient means 37 which serves to bias the valve body 36 upwardly as illustrated in FIG. 4. Resilient spring means 37 comprises a small helical coil spring which is biased between an outwardly extending flange 36a formed on valve body 36, and the lower portion of the tee block fitting 33. The armored cable 18 and the reciprocating flexible connector 28 are secured to the valve body by means of a standard fuel line nut 38 as illustrated in FIG. 4. The armored cable 18 has an outwardly extending flange member 39 which is brazed, soldered, or otherwise fixably secured, to the end of the armored cable. This flange member is securely clamped between the nut 38 and the valve body 33. The reciprocating flexible cable 28 is also fixably secured to the valve body 36 to insure that both members reciprocate together. As was previously pointed out, when the reciprocating member 20 is depressed, it reciprocates downwardly, also reciprocating the flexible member 28. This reciprocating motion is translated to the valve body 36 to urge the valve body downwardly to compress the resilient spring means 37 and close the fuel passageway 33b. When the reciprocating member 20 has reached its downward limit of travel, the locking or engagement lugs 25–27 engage the annular groove 23a to securely lock the valve body 36 in its closed position. When the key means 32 is inserted into tumbler 24 and used to withdraw the locking lugs 25–27 into the reciprocating member 20, the resilient spring means 37 is free to urge the valve body 36 upwardly thereby driving the reciprocating member 20 upwardly by means of the flexible connector 28. The flexible connector is able to transmit this force because the housing member 18 is securely attached to both the valve body and the locking mechanism.

While the foregoing has described the preferred embodiments of the invention, various modifications may become apparent to those skilled in the art to which this invention relates. Accordingly, all such modifications are included within the intended scope of the present invention as recited in the following claims.

I claim:
1. A fuel line lock for a motor vehicle comprising
   a. a fuel line valve adapted to be to the fuel line of the motor vehicle, said valve comprising,
      i. a valve body, said valve body comprising a standard fuel line tee-fitting with a fuel inlet, a fuel outlet, and a branch outlet with cylindrical fuel passageways defined therebetween, said branch outlet providing a reciprocating passageway disposed perpendicularly and communicating with the passageway defined between said inlet and outlet;

ii. a valve member for reciprocating within said branch passageway, said valve member being cylindrical and sized to the interior diameter of the fuel passageway defined within said tee-fitting, said valve member having a first closed and second open position, said valve member completely closing said fuel passageway when reciprocated to its first position, said valve member also defining an angular flange which reciprocates within the branch outlet of said tee-fitting;

iii. a helically coiled spring mounted within said branch outlet and surrounding said valve body to engage said angular flange and thereby urge said valve member to its second open position;

b. actuating means for said fuel line valve, said means comprising a flexible reciprocating member with a flexible armored cable housing, said housing being fixably attached to said valve body through a terminal flange which is secured to said standard tee-fitting with a fuel line nut, said flexible reciprocating member being fixably attached to said valve member;

c. lock means for mounting within said motor vehicle, lock means comprising i. a housing member for securing said lock to said motor vehicle, said housing member defining a reciprocating passageway and at least one indent;

ii. a key operated reciprocating member mounted for reciprocation within said reciprocating passageway between a first depressed position and a second released position, said lock means being fixably attached to said flexible reciprocating member to reciprocate said valve member to its first closed position as said reciprocating member is depressed;

iii. engagement means mounted within said reciprocating means for engaging said indent when said reciprocating means is reciprocated to its first position, said means thereby securing said valve member in its first closed position.

\* \* \* \* \*